(12) United States Patent
Ivanov (10) Patent No.: US 9,360,930 B2
(45) Date of Patent: Jun. 7, 2016

(54) INPUT DEVICE

(75) Inventor: Artem Ivanov, Gilching (DE)

(73) Assignee: MICROCHIP TECHNOLOGY GERMANY GMBH, Gilching (DE)

( * ) Notice: Subject to any disclaimer, the term of this patent is extended or adjusted under 35 U.S.C. 154(b) by 1530 days.

(21) Appl. No.: 13/055,344

(22) PCT Filed: Jul. 22, 2009

(86) PCT No.: PCT/EP2009/005322
§ 371 (c)(1),
(2), (4) Date: Feb. 22, 2011

(87) PCT Pub. No.: WO2010/009875
PCT Pub. Date: Jan. 28, 2010

(65) Prior Publication Data
US 2011/0287838 A1 Nov. 24, 2011

(30) Foreign Application Priority Data

Jul. 22, 2008 (DE) .......................... 10 2008 034 288
Jul. 23, 2008 (DE) .......................... 10 2008 034 309

(51) Int. Cl.
*A63F 9/24* (2006.01)
*G06F 3/01* (2006.01)
*G06F 3/033* (2013.01)

(52) U.S. Cl.
CPC .............. *G06F 3/011* (2013.01); *G06F 3/0334* (2013.01)

(58) Field of Classification Search
CPC combination set(s) only.
See application file for complete search history.

(56) References Cited

U.S. PATENT DOCUMENTS

| 4,906,192 | A  | 3/1990  | Smithhard et al. |
| 6,530,283 | B2 | 3/2003  | Okada et al. ................... 73/780 |
| 7,121,147 | B2 | 10/2006 | Okada ............................ 73/760 |
| 7,174,793 | B2 | 2/2007  | Morimoto ................ 73/865.045 |
| 7,503,507 | B2 | 3/2009  | Usami .......................... 235/492 |

FOREIGN PATENT DOCUMENTS

| EP | 0275665 A2 | 7/1988 | ............. A63B 69/00 |
| GB | 2038597 A  | 7/1980 | |

(Continued)

OTHER PUBLICATIONS

International Search Report and Written Opinion, Application No. PCT/EP2009/005322, 9 pages, Dec. 28, 2009.

(Continued)

*Primary Examiner* — Van Chow
(74) *Attorney, Agent, or Firm* — Slayden Grubert Beard PLLC (57) ABSTRACT

The invention relates to an input device for generating input signals, that as such correlate with the motion as well as the position of a user standing on a contact area. The present invention concerns an input device for generating input signals that as such correlate with the load of a contact area, with a contact area structure that constitutes a substantially horizontally oriented contact area, a foot structure that passes under that contact area structure and supports it as to a support area, a detection circuit for detecting detection events that correlate with the shifting of the. contact area structure as to the foot structure, in which the detection circuit comprises a first electrode device and a second electrode device and both these electrode, devices are operatively coupled with the contact area structure in such a way that during a change of the load of the contact area structure causes a change of the capacity correlated with this loading change of a capacitor system formed each time including the two electrode devices.

12 Claims, 6 Drawing Sheets

(56) References Cited

FOREIGN PATENT DOCUMENTS

| | | | | |
|---|---|---|---|---|
| GB | 2288550 A | 10/1995 | | |
| JP | 09197951 A | 7/1997 | ............... | G09B 9/00 |
| JP | 2001165790 A | 6/2001 | ................ | G01L 1/14 |
| JP | 2004117042 A | 4/2004 | ................ | G01L 1/14 |
| JP | 2004354049 A | 12/2004 | ................ | G01L 1/14 |
| JP | 2006302126 A | 11/2006 | ............. | G06F 3/041 |
| JP | 2007101285 A | 4/2007 | ............. | A63B 71/06 |

OTHER PUBLICATIONS

Japanese Office Action, Application No. 2011-519080, 9 pages, May 21, 2013.

INPUT DEVICE

CROSS REFERENCE TO RELATED APPLICATIONS

This application is the US national phase of PCT application PCT/EP2009/005322, filed 22 Jul. 2009, published 28 Jan. 2010 as WO2010/009875, and claiming the priority of German patent application 102008034288.2 itself filed 22 Jul. 2008 and German patent application 102008034309.9 itself filed 23 Jul. 2008, whose entire disclosures are herewith incorporated by reference.

FIELD OF THE INVENTION

The invention relates to an input device for generating input signals, that as such correlate with the motion as well as the position of a user standing on a contact area.

BACKGROUND OF THE INVENTION

An input device of this type is available on the market under the name of Wii balance Board. By means of this input device the position changes and movements of a user standing on the input device can be detected. These signals are processed by a computer system that is configured with a game or training program. Another input device of the aforementioned type is available on the market under the name Joyboard.

The aforementioned input devices have the problem of being used both by children and adults, and in doing so they must meet with a relatively large weight and load spectrum. There arise limitations in the resolution of the detection of the movements and especially the detection of the centroidal position of the user.

Object of the Invention

The invention is based on the task to create solutions by which it is possible to create an input device of the category of a Wii-Board that can be distinguished by a robust and cost-effectively realizable structure and moreover, by a large load spectrum makes possible a generation of particularly meaningful signals as for the load of a contact area.

Solution According to the Invention

This task is solved according to the invention by an input device for generating input signals that as such correlate with the load of a contact area, with: a contact area structure that constitutes a substantially horizontally oriented contact area, a foot structure that passes under that contact area structure and supports it as to a support area, a detection circuit for detecting detection events that correlate with the shifting of the contact area structure as to the foot structure, in which the detection circuit comprises a first electrode device and a second electrode device and both these electrode devices are operatively coupled with the contact area structure in such a way that during a change of the load of the contact area structure causes a change of the capacity correlated with this loading change of a capacitor system formed each time including the two electrode devices.

In this way it is possible in an advantageous way to reliably detect a wide variety of loading states of the contact area with high dynamics and high definition. The device electronics according to the invention can be used with high design freedom in a wide variety of case variants. The technique according to the invention moreover allows to use the input device as an interface system, by means of which also other signals, using the user as signal communication medium, can be made available to a connected computer.

According to a particularly preferred embodiment of the invention the two electrode devices are coupled with the contact area structure in such a way, that a tilting of the contact area around two axes substantially orthogonal towards each other and substantially parallel to the contact area is detectable. In this way it is possible in an advantageous way to detect the tilting load of the contact area structure. Moreover it is possible to design the two electrode devices, or an additional electrode device in such a way that also a rotary load of the contact area structure around an axis substantially vertical as to the contact area is detectable. Preferably the signals generated by the electrode devices are evaluated together and scaled in such a way that they do not exceed a preset range.

The signals can be generated as analog signals, as digital numbers, or especially as counting values. These counting values can be generated for example by counting the quantity of oscillation cycles that is required for introducing a certain charge into the capacitor system, or for discharging it out of it.

It is possible to structure the electrode device in such a way that it comprises receiving electrodes and auxiliary electrodes. The auxiliary electrodes are preferably attached to that structure, in which the main circuit provided for the further signal processing and signal transmission is not applied. If this main circuit is applied in a subshell or in the foot structure, the auxiliary electrodes are preferably at the bottom of the contact area structure. If the main circuit is integrated into the contact area structure, especially an upper case-shell, the auxiliary electrodes can be integrated into the foot structure, especially into the single feet preferably made of an elastomeric material.

The elastically flexible shifting of the contact area structure is made possible advantageously by spring or elastomeric structures, that deforms under a corresponding load of the contact area structure and in doing so allows a motion of the contact area structure. The suspension arrangement formed in this way is preferably conformed in such a way that the shiftings arising in case of maximum strains of the contact area structure are in the range of one to seven millimeters.

It is possible to integrate into the respective electrode device an encoding or identification circuit, that serves as such to the generation of a signal indicative for the respective electrode device. By this concept it is possible, within the input device according to the invention to handle a signal transfer among the single electrode devices with minimum cabling expenditure on the basis of field-electrical reciprocation principles. The respective electrode devices can be arranged then at the location that is most favorable for the reception of a corresponding shifting signal of the contact area structure and transmit the capacitive measurement detected associated with it, with an address-signal specific for the respective electrode device, to the main circuit. The single electrode devices and the circuits assigned to them can also be formed in such a way that the momentary capacity each time set by them of the sensor-capacitor system can be consulted by means of an address-signal.

The input device according to the invention is according to a particular aspect of the present invention moreover formed in such a way that it provides an interface system by means of which signals can be detected that are coupled, using the body of the user as signal communication medium, into the input device. By this it is especially possible to detect in a tamper-proof way information that for example give indications on the user or on an accessory unit seized or put on by him, like for example a dumb bell, a tennis racket or another practicing instrument.

According to a further aspect of the present invention the task indicated at the beginning is also resolved by a detection device with the characteristics indicated in claim 10.

SHORT DESCRIPTION OF THE FIGS.

Further particulars and features of the invention result from the following description in association with the drawing. The FIGS. show.

DETAILED DESCRIPTION OF THE FIGS.

The input device according to the invention for generating input signals preferably comprises a lower part 1 for installation on a possibly stable floor and a top 2 serving as a contact area structure. This top 2 is preferably made in such a way that it can be tilted by a man or user standing on it around axes that are substantially in parallel with a support plane E defined by this top 2. The elastic suspension of this top is done preferably in such a way that by operational strains, especially by an adult user standing on the input device, an inclination or shifting of the edge of about one to seven millimeters is made possible.

The input device according to the invention can be formed in such a way, that both at the lower part 1 and at the top 2 each time electrodes E1, E2, E3, E4 are applied, each of which form a capacitor system K1, K2. By detecting the change of the respective capacities of these capacitor systems K1, K2 the inclination angle of the top 2 as to the lower part 1 can be calculated and associated with it, corresponding signals can be generated for the further program flow or for other feedback approaches.

According to a particularly preferred embodiment of the invention the relative changes of the capacities of the respective capacitor systems K1, K2 are detected. These changes can be detected particularly precisely by forming a sum of the signals of all capacitor systems K1, K2, . . . and subtracting it from a basic share of the respective signal. The differences remaining after that can be further reinforced. By this concept already relatively small path changes of the contact area structure can be detected with a high resolution and reliably.

Figure 1:
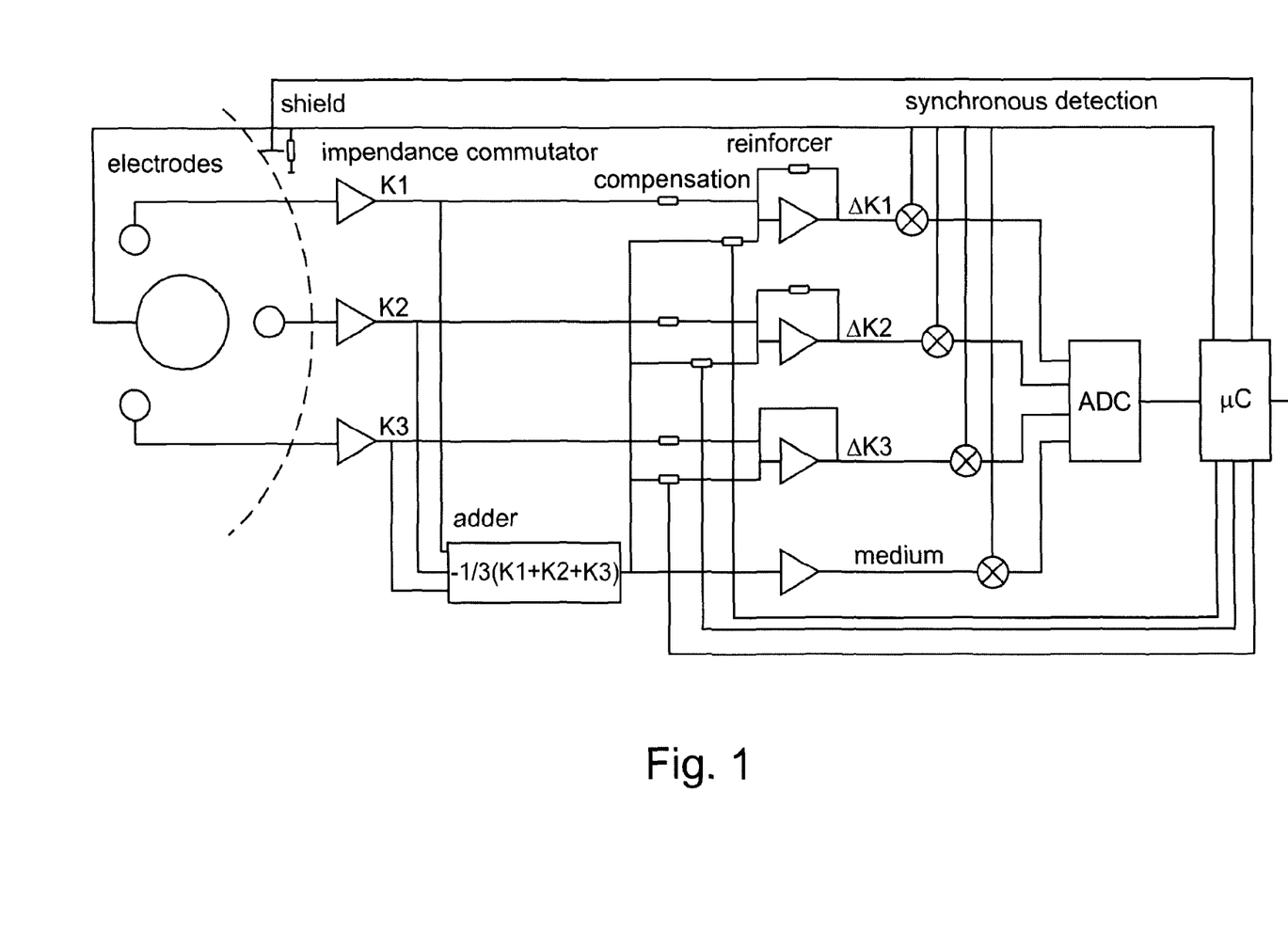
FIG. 1 a schematic representation to illustrate the basic circuit configuration in an input device according to the invention, FIG. 2 several sketches to illustrate a possible structure of an input device according to the invention, that comprises as such four electrode devices as well as a contact area structure supported by an elastomeric structure, FIG. 3 an elementary circuit diagram to illustrate a further variant of an input device according to the invention, FIG. 4 another elementary circuit diagram to illustrate an embodiment of an input device according to the invention with a contact area structure cushioned by a foam rubber structure, FIG. 5 a functional sketch to illustrate further constructive details of a fourth embodiment of an input device according to the invention, FIG. 6 another elementary circuit diagram to illustrate further constructive details of an input device according to the invention.

In FIG. 1 a highly simplified block scheme is visualized, that shows the substantial circuit features of the evaluation circuit according to the invention. This circuit can be realized especially as ASIC, in which by means of the microcontroller, if necessary integrated into the ASIC, based on software a preprocessing of the detected signals can take place, in order to take into account for example geometric particularities of the respective embodiment of the input device. By means of the microcontroller other designs can be served by means of software adaptation. Moreover there is the possibility of the realization of a bridge for the capacities.

Figure 2:
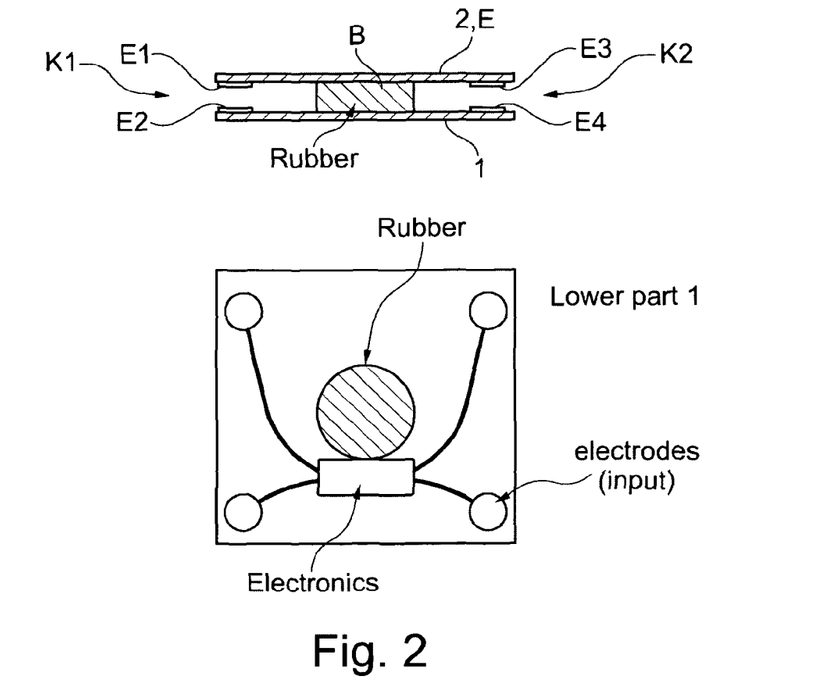

The variant shown in FIG. 2 of an input device according to the invention comprises the top serving as a contact area structure 2 as well as lower part serving as a foot structure 1. The top 2 and the lower part 1 are coupled with each other by means of the elastomeric structure represented here as elastomeric block B. The contact area structure 2 is in accordance with the strains acting on the contact area structure relocatable as to the foot structure or the lower part. By the concept according to the invention can be detected especially tiltings of the contact area structure as to the foot structure. Moreover it is possible, to form the input device in such a way, that also twists of the contact area structure as to the foot structure are detectable.

Figure 3:
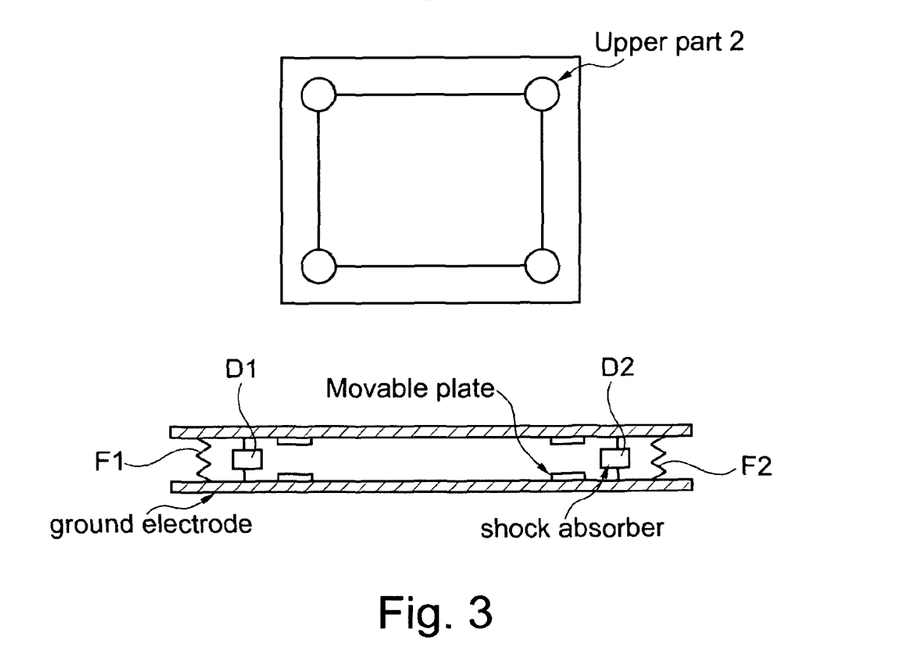

In the further variant represented in FIG. 3 the elastically flexible support of the contact area structure as to the foot structure takes place by elastic elements F1, F2, that are applied in the edge zone of the input device. The input device according to the invention is moreover provided with attenuators D1, D2, by which the shifting of the foot structure as to the contact area structure can be dampened.

Figure 4:
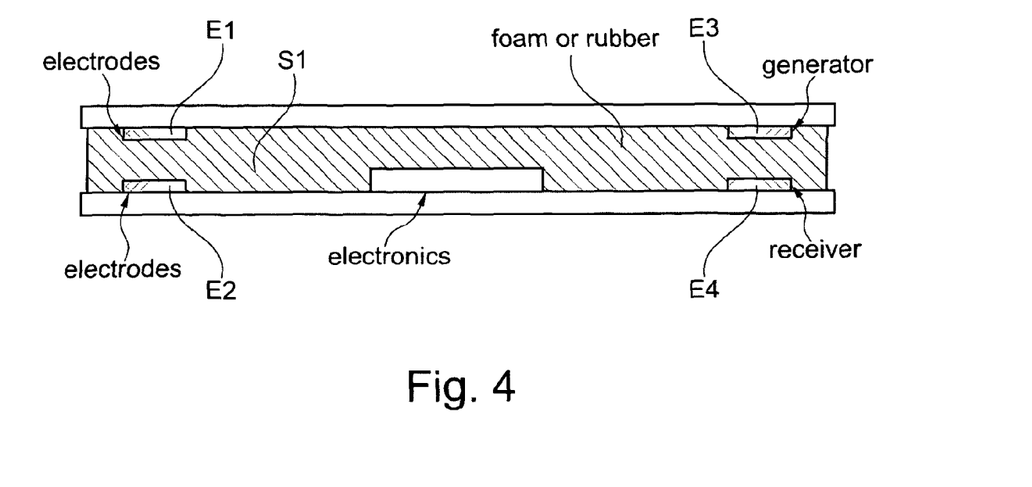

In the variant shown in FIG. 4 the contact area structure is elastically coupled with the foot structure by means of a foam rubber layer S1. Also in this embodiment it is possible, by electrode systems applied both at the contact area structure and at the foot structure, to reliably detect the spatial shifting of the contact area structure as to the foot structure. The evaluation and signal preprocessing electronics, as well as the detection electrodes E1, E2, E3 and E4, are embedded in a hermetically encapsulated way in the foam rubber layer S1.

Figure 5:
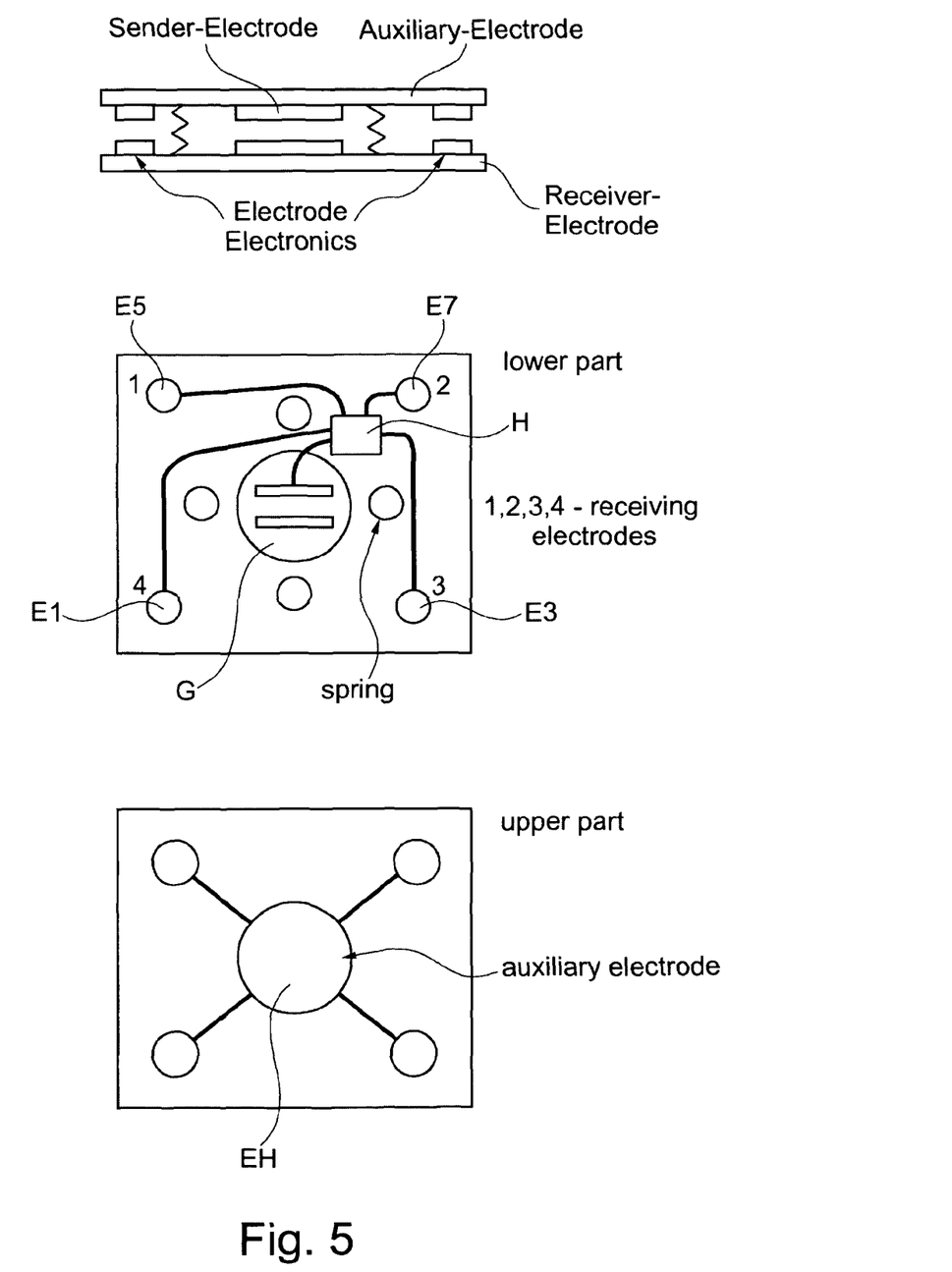

In the variant represented in FIG. 5 of an input device according to the invention all the electrodes E1, E3, E5, E7, that as such must be connected to the main electronics H, are in one area—here that of the lower component or of the foot structure. The signal of the here centrally arranged generator electrode G is transported to the receiving electrodes by means of an auxiliary electrode EH. This auxiliary electrode EH is applied at the top or at the bottom of the contact area structure. The coupling of the corresponding electric field is done in a capacitative way. The auxiliary electrode HE can be a thin layer, if necessary applied as a varnish or vapor-deposited. It is also possible to punch the auxiliary electrode out of a thin sheet material and to secure it sufficiently rigidly at the contact area structure by security and clawing structures for example formed at the bottom of the contact area structure.

Figure 6:
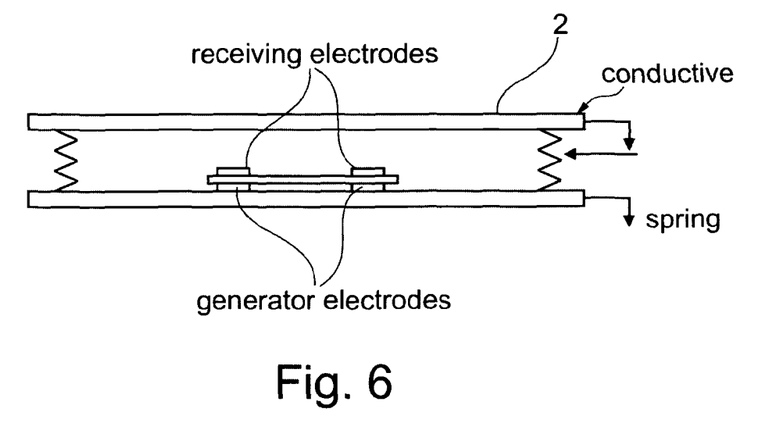

In the variant represented in FIG. 6 the total electronic circuit including the detection electrodes is situated on a relatively small printed circuit, that is arranged substantially at the center of the input device.

The upper, in this representation, receiving electrodes are at the top above the generator electrodes arranged on the reverse side or bottom of the printed circuit. The top forming the contact area structure 2 is preferably made of an electric conductive material or provided with an electrically conductive coating and preferably galvanically connected with the lower part. By this an earth coupling and shield against the outside is achieved. By the disposition shown here the approach of the contact area structure to the electrodes applied directly at the board is measured. The detection precision of this disposition can be increased by arranging the respective detection electrodes relatively far from the center of the input device, since in this way each time larger distance changes of the contact area structure as to the electrodes arise. In principle the distance of the electrodes at the top and at the lower part is maintained possibly small, so that a maximization of the relative capacitance change is reached.

Figure 7:
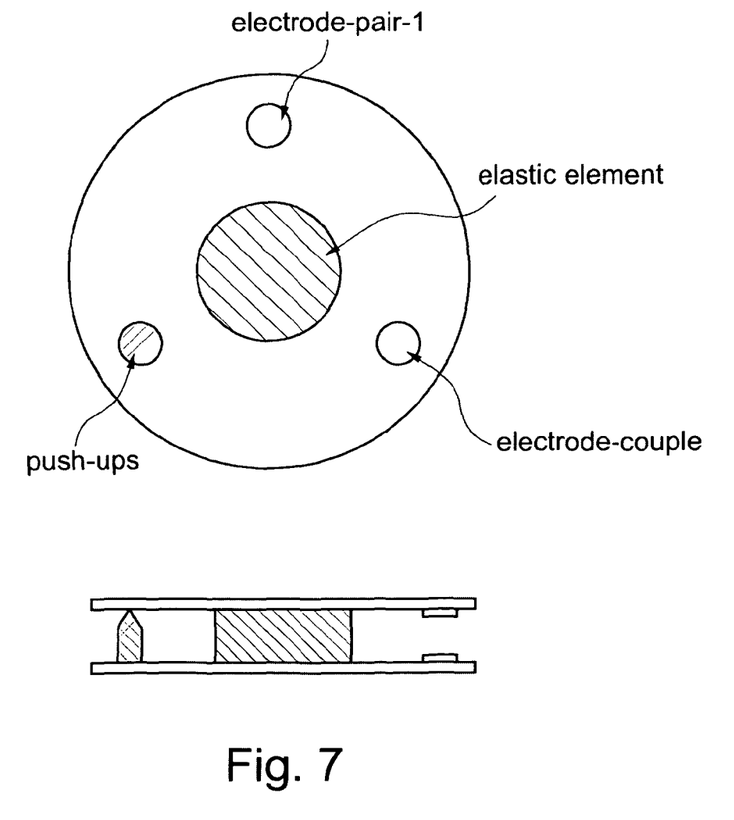
FIG. 7 a further elementary circuit diagram to illustrate further constructive details of an input device according to the invention.

For the detection of the inclination around at least two spatial axes preferably at least two electrode systems are provided. A corresponding variant of execution is visualized in FIG. 7.

Preferably however the input device according to the invention is equipped with several electrode pairs or electrode systems, in which the measuring signals generated by these respective electrode systems or detected capacitance variations are evaluated in a overlapped way.

Especially it is possible, in case of four electrodes to subtract the values of determined electrode pairs from each other.

The sum signal corresponds to a measuring signal correlating with the total encumbrance of the contact area structure.

It is possible to compensate possible non-linearities of the single channels by a corresponding design of the respective signal amplification, or also during signal end processing. The signals each time generated by the capacitor systems can be demodulated synchronously, in order to improve the signal-to-noise ratio.

The transmission of the signals detected by the input device according to the invention to an evaluation system, especially a console, is done preferably wirelessly. Into the input device power supply means can be integrated, that as such generate the necessary operational energy from the mechanical work done during the use on the input device. For the rest it is also possible to realize the power supply of the input device by battery or accumulator systems.

The input device according to the invention can be formed in such a way that it acts as an interface for intrabody signal transmission systems. By this it becomes especially possible to detect the capture or another use of peripheral equipments as well as ID-cards and to consider them in the program.

The input device according to the invention can be made in such a way that it also detects torsional moments around a substantially vertical axis. By this especially for the simulation of board sport appliances like surfboards, snowboards, and other boards typical strains can be detected.

A particularly robust and cost-effectively practicable embodiment of the invention consists in the fact that it comprises several elastomeric adjusting feet, in which each time auxiliary or generator electrodes are integrated, the position of which as to a complementary electrode can be changed by a change of the load of the adjustable foot. It is also possible to insert complete capacitor systems into this adjusting feet and to interrogate the loading state of the respective adjustable foot by addressed interrogation of a circuit included in the adjustable foot.

Figure 8A:
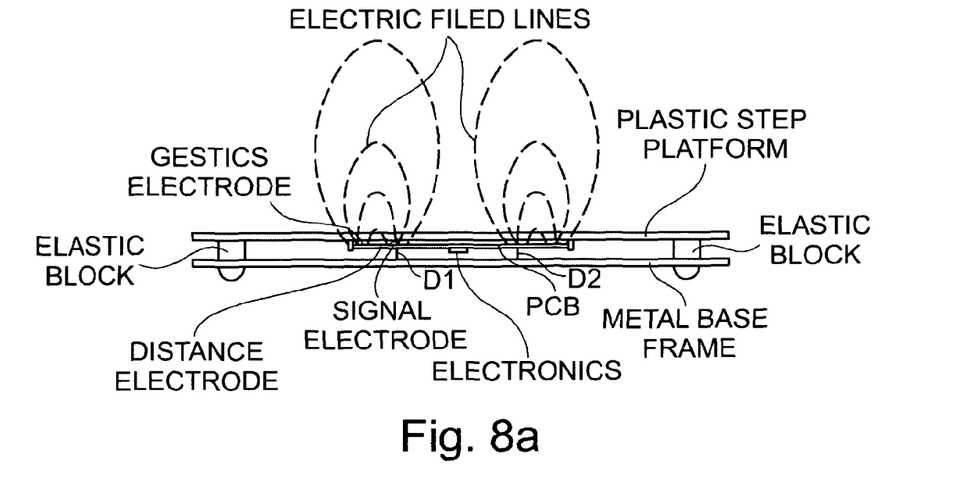
FIGS. 8a 8b, and 8c an elementary circuit diagram to illustrate the structure of a detection device according to the invention in which additionally for detecting the shifting of a contact area structure, a detection without contact of objects occurs, especially limbs, that are in an area (e.g. ca. 30 cm) above a contact area.
Figure 8B:
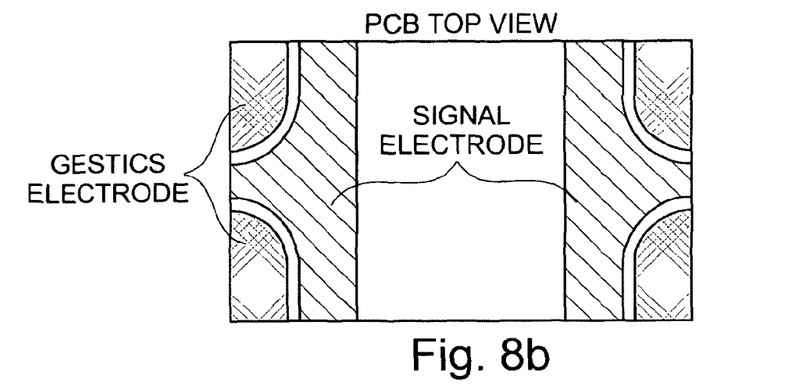
Figure 8C:
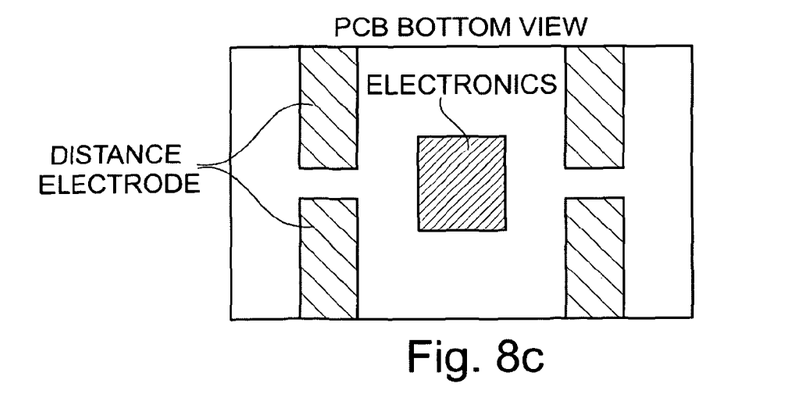

In the FIGS. 8a to 8c the structure of a further detection device according to the invention is visualized, in which in addition to detecting the shifting of a contact area structure, a detection without contact of objects occurs, especially limbs, that are situated in an area (e.g. about 30 cm) above a contact area. By this concept it becomes possible for example in case of gymnastic exercises that demand shifting the legs or arms of a user into the area above the contact area, to recognize the execution of these exercises. Similarly it becomes also possible for example to detect the execution of push-ups by means of the detection device. Through the circuit according to the invention can moreover also be established if the user stands with both feet or only with one foot on the detection device. The detection device can be set, possibly by means of a Teach mode, in such a sensitive way, that based on the field diffusion induced by the user, also certain postures, e.g. crouching, or also spreading the arms, can be detected.

As can be seen in FIG. 8a, it is possible to arrange the receiving electrodes in such a way that they generate several "lobe-shaped fields" emitted in the area above the contact area, by means of which a detection without contact of limbs is done. The receiving or detection electrodes can be formed in such a way that they particularly efficiently recognize the changes, caused by the object to be detected, of the dielectric characteristics of the electrode environment.

In FIG. 8b a preferred design of the signal electrode provided for the field emission and of the gesture electrodes provided for detecting a field bridging—here arranged in the angle zone of the detection device—is visualized.

The whole electronic circuit is realized on a board that as such on its upper side carries the signal electrode and the gesture electrodes. The board is fixed at the top, i.e. the contact area structure. At the bottom of the board there are the spacing electrodes, by which the tilting of the top as to the lower part, here consisting of a metal plate, is detected. The drive of the single electrode systems can be done by a multiplexer circuit that is integrated for example still into an ASIC conformed for tension generation and signal preprocessing.

The invention claimed is:

1. An input device for generating input signals that correlate with the load applied to a contact area, the device comprising:
    a contact area structure that constitutes a substantially horizontally oriented contact area,
    a foot structure that passes under said contact area structure and supports same on a floor ground,
    a detection circuit attached to a bottom surface of the contact area for detecting detection events that correlate with the shifting of the contact area structure relative to said foot structure and for detecting the presence, position and/or motion of objects,
    wherein the detection circuit comprises a substrate with a top and a bottom side attached to said contact area structure, wherein the top side comprises a generator electrode and a plurality of receiving electrodes surrounding said generator electrode, and further comprises on said bottom side a plurality of distance electrode devices which are operatively coupled with the contact area structure in such a manner that within a capacitor system including said plurality of distance electrode devices and a metal base in said foot structure a change of the capacity occurs during a change of the load applied on the contact area structure, wherein said change of capacity is occurring in correlation with the change of load applied to said contact area structure, and
    wherein the generator electrode coupled with the contact area generates an electric field emitted in the area above the contact area for detecting the presence, position, and/or motion of objects that are situated above the contact area.

2. The input device according to claim 1, wherein the plurality of distance electrode devices are coupled with the contact area structure in such a way that a tilting of the contact areas around two axes substantially parallel to the contact area is detectable.

3. The input device according to claim 1 wherein an electrode device is provided, by means of which a torque applied to the contact area structure around an axis substantially vertical as to the contact area is detectable.

4. The input device according to claim 1 further comprising an auxiliary electrodes wherein the receiving electrodes transfer a signal for detecting the detection events and form a capacitor together with the auxiliary electrodes.

5. The input device according to claim 1 wherein the auxiliary electrodes is attached to a top surface of the contact area structure.

6. The input device according to claim 1 wherein auxiliary electrodes are attached to a bottom surface of the contact area structure.

7. The input device according to claim 1 wherein an elastomeric structure is provided on said foot structure, for elastically supporting the contact area structure.

8. The input device according to claim 1 wherein the elastomeric structure constitutes several support feet.

9. The input device according to claim 1 wherein an identification circuit is configured to receive signals through a body of a user.

10. A balance board comprising the input device according to claim 1, wherein a user stands on top of the contact area structure.

11. A system comprising a balance board according to claim 10 and further comprising a computer system configured with a gaming or training software.

12. The system according to claim 11, wherein the system detects a posture of the user.

* * * * *